United States Patent
Juretzka et al.

(10) Patent No.: US 7,044,104 B2
(45) Date of Patent: May 16, 2006

(54) INTERNAL COMBUSTION ENGINE WITH COMPRESSION IGNITION

(75) Inventors: Andreas Juretzka, West Bloomfield, MI (US); Jochen Schäflein, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/086,798

(22) Filed: Mar. 22, 2005

(65) Prior Publication Data

US 2005/0205058 A1 Sep. 22, 2005

Related U.S. Application Data

(63) Continuation-in-part of application No. PCT/EP03/10514, filed on Sep. 20, 2003.

(30) Foreign Application Priority Data

Sep. 24, 2002 (DE) ................................ 102 44 364

(51) Int. Cl.
*F02B 3/00* (2006.01)

(52) U.S. Cl. ...................... 123/299; 123/295
(58) Field of Classification Search ............... 123/299, 123/300, 305, 430, 295, 304, 297, 568.14, 123/DIG. 7

See application file for complete search history.

(56) References Cited

U.S. PATENT DOCUMENTS

| | | | |
|---|---|---|---|
| 6,343,585 B1 | 2/2002 | Fujieda et al. | 123/295 |
| 6,354,264 B1 * | 3/2002 | Iwakiri et al. | 123/305 |
| 6,609,493 B1 * | 8/2003 | Yamaguchi et al. | 123/299 |
| 6,622,690 B1 * | 9/2003 | Ando et al. | 123/295 |
| 6,636,797 B1 * | 10/2003 | Yoshizawa et al. | 701/104 |
| 6,755,175 B1 * | 6/2004 | McKay et al. | 123/297 |
| 6,772,585 B1 * | 8/2004 | Iihoshi et al. | 60/277 |
| 2002/0007816 A1 | 1/2002 | Zur Loye et al | 123/295 |

FOREIGN PATENT DOCUMENTS

WO WO 02/33425 4/2002

* cited by examiner

*Primary Examiner*—Mahmoud Gimie
(74) *Attorney, Agent, or Firm*—Klaus J. Bach

(57) ABSTRACT

In a method for operating an internal combustion engine with direct fuel injection, in which air and a first fuel quantity are fed to a combustion chamber, in such a manner that a homogenous lean base mixture is formed in the combustion chamber, and a second fuel quantity is introduced into the combustion chamber in the region of a top dead center position of the piston, in such a manner that an ignitable mixture cloud is formed within the homogenous lean base mixture in the region of an ignition source, and the mixture cloud formed by the second fuel quantity is ignited by means of the ignition source, so that the lean homogenous base mixture which is present in the combustion chamber is compressed by the combustion of the mixture cloud formed by the second fuel quantity and ignited thereby.

8 Claims, 2 Drawing Sheets

INTERNAL COMBUSTION ENGINE WITH COMPRESSION IGNITION

This is a Continuation-In-Part Application of International Application PCT/EP2003/010514 filed Sep. 20, 2003 and claiming the priority of German Application 102 44 364.5 filed Sep. 24, 2002.

BACKGROUND OF THE INVENTION

The invention relates to a method for operating an internal combustion engine with fuel injection, including a cylinder with a cylinder head and a piston disposed in the cylinder into which air and a first fuel quantity are fed to form a homogeneous base mixtureture for ignition and combustion in the engine together with a direct injection mixtureture.

In direct-injection internal combustion engines with compression ignition, homogenous lean fuel/air mixturetures are often brought to compression ignition, so that high efficiencies and improved exhaust emissions are achieved. In internal combustion engines of this type, the compression ignition results in steep pressure rises in the combustion chamber at high loads, which can have an adverse effect on operation.

DE 199 27 479 C2 discloses a method for operating an internal combustion engine operated with gasoline, in which the fuel/air mixture is subjected to spark ignition or compression ignition depending on the load point. In this case, a suitable, high compression ratio is provided for the compression ignition. In a part-load range of the internal combustion engine, the homogenous fuel/air mixtureture is compression-ignited, while in a full-load range and during a cold start of the internal combustion engine the fuel/air mixture is spark-ignited.

DE 198 04 983 A1 discloses a method for operating an internal combustion engine operating in accordance with the four-stroke principle, in which a homogenous lean base mixture of air and fuel is ignited by compression ignition. In this case, the fuel is introduced directly into the combustion chamber by direct fuel injection, in such a manner that, with the formation of a homogenous mixture, the input of energy resulting from the compression provides for a homogenous ignition, resulting in an extensive, self-accelerating release of energy. In this method, the combustion is optimized by varying the compression and by using a targeted final homogeneity of the fuel/air mixture.

According to the current state of the art, the combustion described above can only be controlled with difficulty, since the instant of compression ignition is dependent to a very considerable extent on the engine parameters and the environmental conditions. Therefore, it is attempted to control the initiation of the compression ignition with the aid of certain control variables, e.g. by means of a cylinder pressure signal. However, concepts of this type entail a high level of outlay on engine control technology, which increases the costs of producing internal combustion engines of this type.

Therefore, it is the object of the present invention to provide a method for operating an internal combustion engine in which the initiation of compression ignition is easy to control and reliable engine operation is ensured.

SUMMARY OF THE INVENTION

In a method for operating an internal combustion engine with direct fuel injection, in which air and a first fuel quantity are fed to a combustion chamber in such a manner that a homogenous lean base mixtureture is formed in the combustion chamber, and a second fuel quantity is introduced into the combustion chamber in the region of a top dead center position of the piston, so that an ignitable mixture cloud is formed within the homogenous lean base mixtureture in the region of an ignition source, and the mixtureture cloud formed by the second fuel quantity is ignited by means of an ignition source, so that the lean homogenous base mixture which is present in the combustion chamber is compressed by the combustion of the mixtureture cloud formed by the second fuel quantity and ignited thereby.

As a result, the initiation of the compression ignition is controlled in such a manner that the instant at which the mixtureture cloud is ignited determines or influences the instant of the subsequent compression ignition of the base mixtureture. Therefore, in substantially all operating states of the compression ignition, the internal combustion engine is operated in such a manner that it is possible to utilize the potential with regard to consumption and exhaust emissions. Furthermore, the method according to the invention requires no complex combustion control and special measurement technology.

In one configuration of the invention, during an exhaust stroke exhaust gas is retained in the combustion chamber for controlling the temperature of the base mixtureture.

According to another configuration of the invention, the exhaust gas retained in the combustion chamber is compressed after an exhaust valve has closed during the exhaust stroke of the internal combustion engine, so that subsequently the first fuel quantity is fed to the combustion chamber filled with the compressed, retained exhaust gas. This ensures that the fuel which has been introduced into the combustion chamber is mixtureed with the hot exhaust gas and quickly vaporized. This provides a substantially homogenous lean base mixture at a defined base temperature.

In a further configuration of the invention, the first fuel quantity is introduced into the combustion chamber in a region between 460° crank angle and 150° crank angle before an ignition top dead center. The early introduction of the fuel into the combustion chamber further enhances the homogenization of the base mixture consisting of fuel, air and if appropriate exhaust gas.

Preferably, the second fuel quantity is injected directly into the combustion chamber in a region between 0° crank angle and 100° crank angle before ignition top dead center. The late direct injection of the second fuel quantity ensures that the mixture cloud which is formed is formed in the vicinity of the ignition source, so that it can be reliably ignited.

The mixture cloud which is formed by the second fuel quantity in the region of the ignition source is ignited in an area of between 80° crank angle before the ignition top dead center and 10° crank angle after the ignition top dead center.

The invention is illustrated in a simplified form in the drawings. It will become more readily apparent form the following description thereof on the basis of the accompanying drawings:

DESCRIPTION OF A PREFERRED EMBODIMENT

Figure 1:
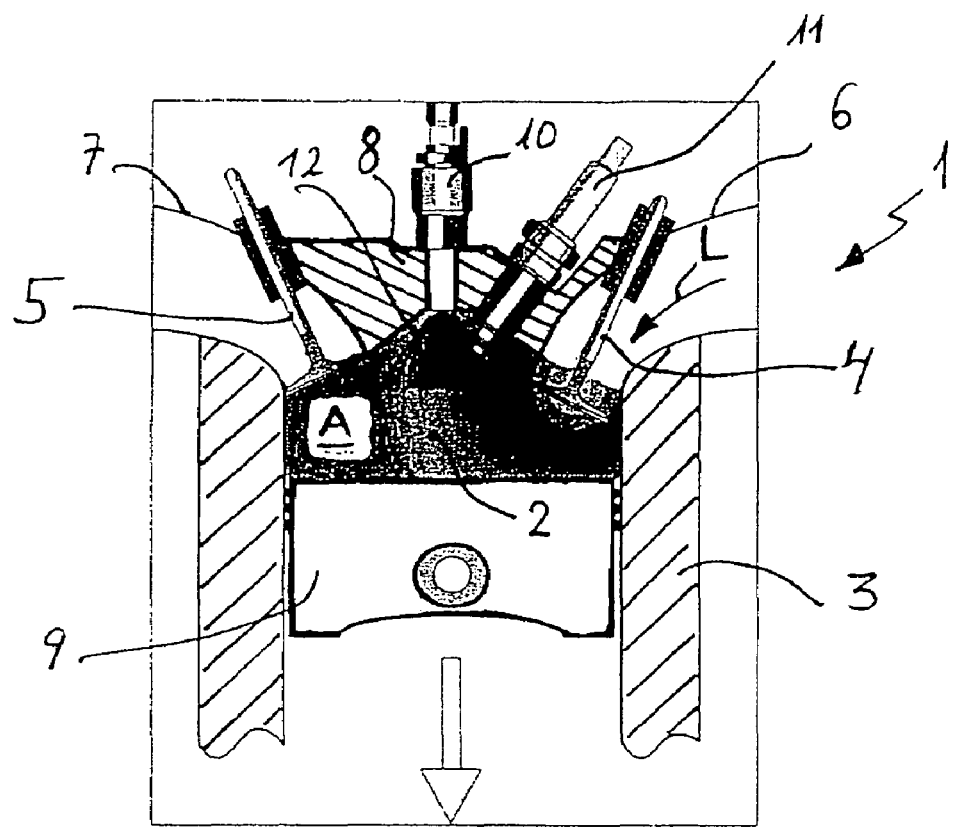
FIG. 1 is a sectional illustration of an internal combustion engine during an intake stroke.

FIG. 1 illustrates an internal combustion engine 1 with direct fuel injection, in which a combustion chamber 2 is formed in at least one cylinder 3 by a piston 9, which is held in a longitudinally displaceable manner, and a cylinder head 8. The internal combustion engine 1 comprises at least one intake valve 4, at least one exhaust valve 5, a fuel injector 10 and an ignition source 11 for each combustion chamber. Furthermore, an intake port 6 and an exhaust port 7 are arranged in the cylinder head 8. The number of intake and exhaust valves is only an example and can be increased if necessary.

The combustion chamber 2 of the internal combustion engine 1 is closed off at the top by the cylinder head 8, with the piston 9 guided in the cylinder 3 delimiting the combustion chamber 2 at the bottom. The internal combustion engine 1 according to the invention operates on the basis of the four-stroke principle; as an alternative, it can also be operated in accordance with the two-stroke principle.

In a first intake stroke of a cycle, the piston 9 moves downward until it reaches a bottom dead center BDC. During this stroke, combustion air L is fed into the combustion chamber 2 via the intake port 6, with a certain quantity of exhaust gas A being retained in the combustion chamber 2 during the exhaust stroke of the preceding cycle, so that the combustion air L is heated to a defined temperature by the hot exhaust gas A in the combustion chamber 2. A first fuel quantity 12 is injected directly into the combustion chamber 2 during the intake stroke of the internal combustion engine 2, by means of the injector 10, so that a base mixture GG consisting of exhaust gas A, fuel 12 and combustion air L with an air/fuel ratio $\lambda$ of between 1 and 2 is formed. It is preferable for the first fuel quantity 12 to be introduced into the combustion chamber in a region between 460° CA and 150° CA before an ignition top dead center ITDC.

Figure 2:
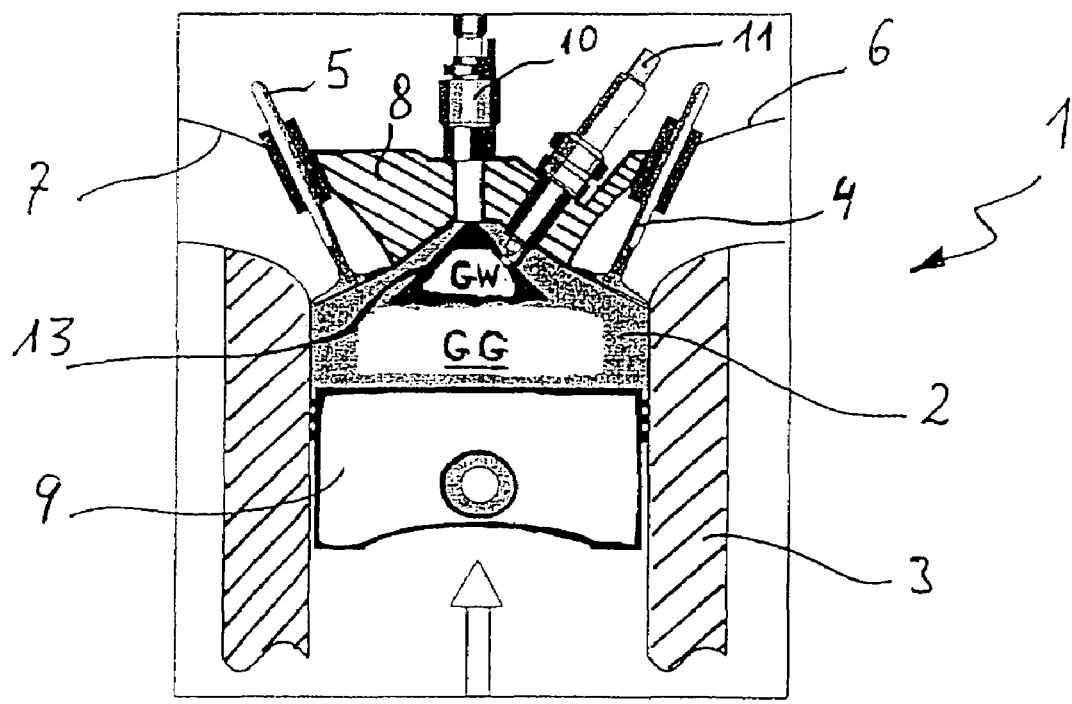
FIG. 2 is a sectional illustration of the internal combustion engine shown in FIG. 1 during a compression stroke.

In accordance with FIG. 2, in a following compression stroke the piston 9 moves upward from the bottom dead center BDC to the ignition top dead center ITDC, with a further, second fuel quantity 13 being injected directly in a region of the ignition top dead center ITDC. The second fuel quantity 13 injected into the combustion chamber leads to a local, ignitable mixture cloud GW which is formed in the region of the electrodes of the spark plug 11, in such a manner that an air/fuel ratio $\lambda \geqq 1$ is established. It is preferable for the second fuel quantity 13 to be injected directly into the combustion chamber 2 in a region between 0° CA and 100° CA before the ignition top dead center ITDC.

The ignitable mixture cloud GW is ignited by means of the spark plug 11 in an area before the piston reaches the ignition top dead center ITDC. The combustion of the mixture cloud GW releases energy, with the result that the base mixture GG is heated and subjected to compression ignition. Furthermore, the combustion of the mixture cloud GW increases the pressure within the base mixture GG, so that the compression ignition conditions for the base mixture GG are improved. It is preferable for the mixture cloud GW formed by the second fuel quantity 13 in the area of the ignition source 11 to be ignited about between 80° CA before the ignition top dead center ITDC and 10° CA after the ignition top dead center ITDC.

Since the mixture cloud GW is ignited prior to the actual compression ignition, the instant of energy conversion for the base mixture GG can be controlled. The instant of the spark ignition of the mixture cloud GW has a direct influence on the instant of the subsequent compression ignition of the base mixture GG. During the combustion of the mixture cloud GW initiated by the spark ignition, a flame front 16 is formed and is substantially extinguished after the mixture cloud GW has been consumed. However, the energy released causes a plurality of compression ignition centers 15 to form in the base mixture GG, and these compression ignition centers 15 can cause the combustion of the base mixture GG to progress independently of the position of the flame front 16. The result of this is that the NOx emissions are kept at a very low level because of a low mean combustion temperature. Unlike when using a conventional stratified charge, the base mixture GG is burnt in the absence of flame fronts.

Figure 3:
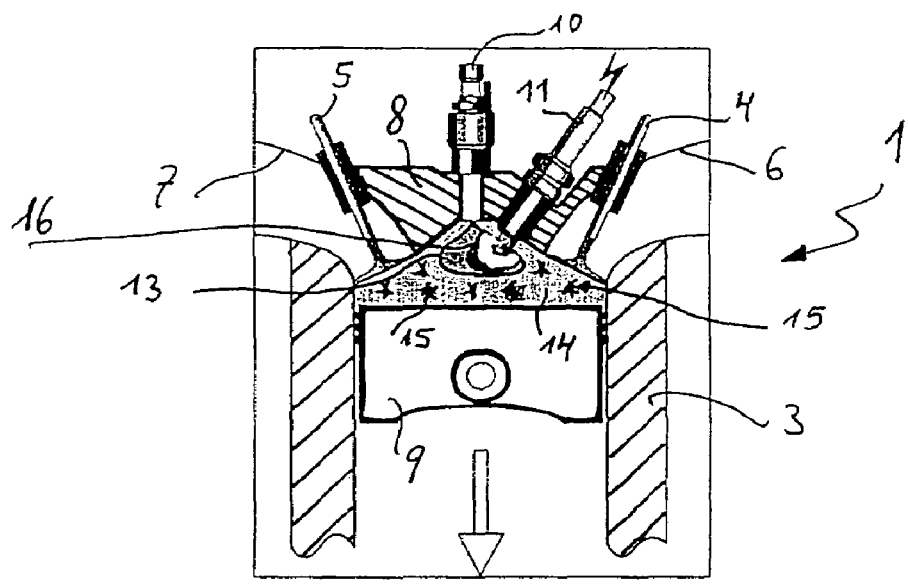
FIG. 3 is a sectional illustration of the internal combustion engine shown in FIG. 1 during ignition of the fuel/air mixture formed in a combustion chamber.

In accordance with FIG. 3, while the combustion is still taking place, the piston 9 moves downward until it reaches a bottom dead center BDC. In a further, final stroke, the piston 9 moves upward to a gas exchange top dead center GTDC and expels the exhaust gases from the combustion chamber 2 via the exhaust port 7. The injection instant of the second fuel quantity 13 is determined by the duration which is required to optimally homogenize the second fuel quantity 13 in the region of the ignition source 11. The ignition instant of the spark ignition is then set in such a way that the combustion represents an optimum with regard to consumption and exhaust emissions. During combustion of the second fuel quantity 13, the base mixture GG is heated, so that the base mixture GG, which is at a high energy level in the remaining combustion chamber 14, is compression-ignited, under conditions which are substantially close to those for compression ignition.

Figure 4:
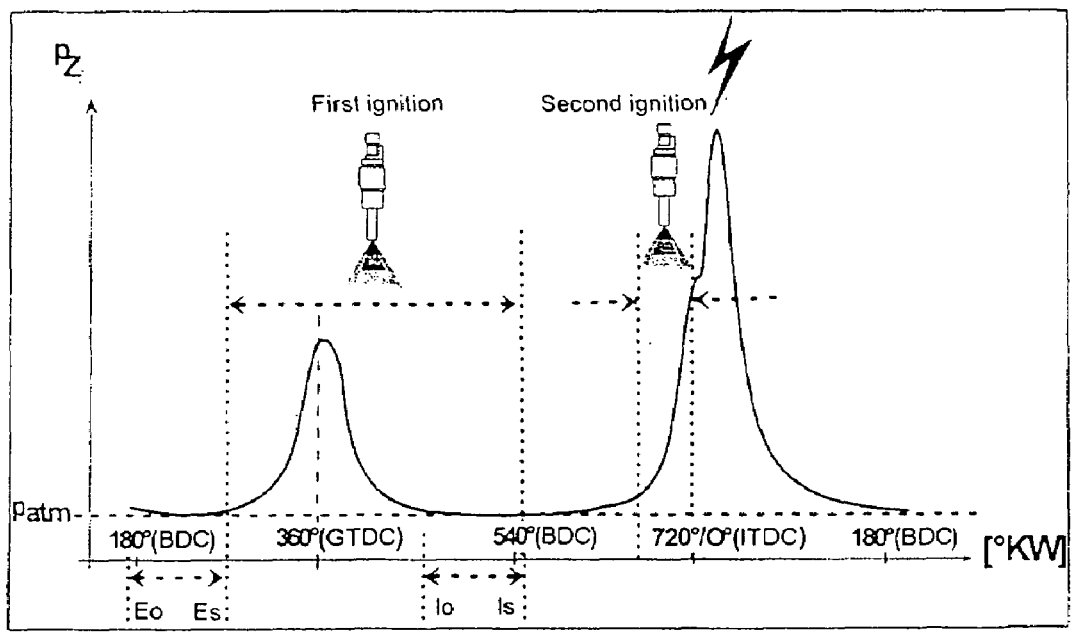
FIG. 4 shows a schematic diagram of a cylinder pressure curve of the internal combustion engine of FIG. 1 during operation according to the invention, plotted over the crank angle.

A cylinder pressure curve $P_z$ of the internal combustion engine 1 is plotted against the crank angle CA in FIG. 4. The method according to the invention provides for a valve overlap to retain exhaust gas in the combustion chamber 2 in order to allow a defined base mixture temperature to be set. This temperature is set in such a manner, as a function of the quantity of exhaust gas retained in the combustion chamber 2, that the base mixture GG is not yet subject to compression ignition at the end of the compression phase. The energy required for compression ignition of the base mixture is provided by the second fuel quantity 13 being injected directly into the combustion chamber 2 and then ignited before the end of the compression phase.

In accordance with FIG. 4, the exhaust valve 5 is opened during the exhaust stroke of the internal combustion engine 1 in a region around the bottom dead center BDC, so that the exhaust gases are expelled from the combustion chamber 2. The exhaust valve 5 is then closed before the gas exchange top dead center GTDC is reached, so that the exhaust gas A which has been retained in the combustion chamber 2 is compressed. The first fuel quantity 12 which is then injected is mixtureed with the hot exhaust gas A and vaporized. During the intake stroke of the internal combustion engine 1, combustion air L is taken in as a result of the intake valve 4 opening, so that the exhaust gas located in the combustion chamber 1 is mixtureed with the vaporized fuel and the combustion air L. The injection of the first fuel quantity 12 can take place during or after the intake of combustion air. As a result, a lean homogenous base mixture GG is formed. The base mixture GG should be sufficiently lean, preferably with an air/fuel ratio of between 1 and 2, for local compression ignition just not to take place during the compression phase. It is conceivable for the first fuel quantity 12 to be introduced into the combustion chamber after the exhaust valve 5 has closed until an initial part of the compression stroke. Furthermore, it is conceivable for the first fuel quantity 12 to be introduced cyclically into the combustion chamber, in order to avoid wetting of the cylinder wall with fuel. Then, during the compression phase, the second fuel quantity 13 is injected into the combustion chamber in a region around the ignition top dead center ITDC, in such a manner that an ignitable mixture cloud GW is formed in the region of the spark plug. It is also conceivable for the second fuel quantity 13 to be introduced cyclically into the combustion chamber. Spark ignition initiates the combustion of the mixture cloud GW in the region of the ignition top dead center.

It is conceivable for the method according to the invention to be carried out with exhaust-gas recirculation rather than the exhaust-gas retention. In this case, exhaust gas from the exhaust port 7 is recirculated into the intake port 6 by means of an exhaust-gas recirculation valve (not shown), so that a defined base mixture temperature is established. Alternatively, the exhaust-gas recirculation may be carried out internally. In this case, during the exhaust cycle the exhaust gas is partially expelled into the intake port 6 via the open intake valve 4 and then taken back into the combustion chamber 2 together with the intake combustion air L during the intake stroke. For this purpose, the intake valve 4 is opened in an initial part of the exhaust stroke and closed in an end part of the induction stroke, with the exhaust valve 5 being opened during the exhaust stroke and closed at the end of the exhaust stroke.

Furthermore, the exhaust-gas recirculation may be carried out internally, such that the exhaust gas is expelled into the exhaust port 7 during the exhaust stroke and is then partly taken back into the combustion chamber 2 via the open exhaust part 5 during the induction stroke. In this case, the valve 4 is opened after or during the closing of the exhaust valve 6. For this purpose, the exhaust valve 5 is opened in an initial part of the intake stroke, with the exhaust valve 4 being open in an initial part of the intake stroke and closed in an end part of the intake stroke, so that the combustion air L flows into the combustion chamber 2 after or during the closing of the exhaust valve 6.

Furthermore, it is conceivable for the first fuel quantity 12 to be introduced into the combustion chamber by means of induction-pipe fuel injection. Furthermore it is possible to use a fuel injector which is able to mixture the fuel with combustion air and then blow them into the combustion chamber in the form of a mixtureture. Alternatively, it is possible to use a fuel injector which simultaneously serves as an ignition source.

The method according to the invention allows the combustion of a homogenous mixtureture by means of compression ignition without complex engine control. This ensures that compression ignition of the homogeneous fuel/air mixtureture takes place in each combustion cycle independently of the engine parameters and environmental conditions. Consequently, combustion misfires are reliably avoided with homogeneous combustion by means of compression ignition.

This enables the internal combustion engine 1 to be operated with compression ignition at all load points or load ranges. Furthermore, it is ensured, virtually irrespective of the engine parameters and environmental influences, that no misfires occur throughout the entire operation. As a result, exhaust gas is formed by each combustion cycle, which is necessary for the subsequent combustion cycle when operating the internal combustion engine in accordance with the invention. This ensures that combustion with compression ignition can take place in each cycle. It is therefore likewise possible, in an upper load range, to achieve lower combustion chamber pressure fluctuations as a result of the controlled ignition instant.

The invention claimed is:

1. A method for operating an internal combustion engine with fuel injection having a cylinder, a cylinder head with an ignition source, a piston and a combustion chamber that is delimited between the cylinder head and the piston, said method comprising the steps:

supplying air and a first fuel quantity to the combustion chamber, in such a manner that a homogeneous lean base mixture is formed in the combustion chamber, introducing a second fuel quantity into the combustion chamber in the area of a top dead center position of the piston, in such a manner that an ignitable mixture cloud is formed within the homogenous lean base mixture in the region of the ignition source, and igniting the ignitable mixture cloud formed by the second fuel quantity in the region of the ignition source by means of the ignition source in an area between 80° CA before the ignition top dead center and 10° CA after the ignition top dead center position of the piston, the lean homogenous base mixture which is present in the combustion chamber subsequently being subjected to compression ignition by the combustion of the mixture cloud formed by the combustion of the second fuel quantity.

2. The method as claimed in claim 1, wherein, during an exhaust stroke of the internal combustion engine, exhaust gas is retained in the combustion chamber.

3. The method as claimed in claim 2, wherein the exhaust gas retained in the combustion chamber is compressed after an exhaust valve has closed during the exhaust stroke of the internal combustion engine and subsequently the first fuel quantity is fed to the combustion chamber filled with the retained exhaust gas.

4. The method as claimed in claim 1, wherein the first fuel quantity is introduced into the combustion chamber in a region between 460° CA and 150° CA before the ignition top dead center position of the piston.

5. The method as claimed in claim 1, wherein the second fuel quantity is injected directly into the combustion chamber in a region between 0° CA and 100° CA before the ignition top dead center position of the piston.

6. The method as claimed in claim 1, wherein the first fuel quantity is injected into an induction pipe of the internal combustion engine or directly into the combustion chamber.

7. The method as claimed in claim 1, wherein a fuel injection device arranged in the combustion chamber is simultaneously used as the ignition source.

8. The method as claimed claim 1, wherein the internal combustion engine is operated with a compression ratio of between 8 and 16.

* * * * *